US006555181B1

(12) United States Patent
Santos et al.

(10) Patent No.: US 6,555,181 B1
(45) Date of Patent: Apr. 29, 2003

(54) PROCESS FOR MAKING FUSER AND FIXING MEMBERS

(75) Inventors: Carla M. Santos, Webster, NY (US); Elizabeth L. Ogren, Rochester, NY (US); Alan R. Kuntz, Webster, NY (US); George A. Riehle, Webster, NY (US); Laurence J. Lynd, Macedon, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/722,277

(22) Filed: Nov. 28, 2000

(51) Int. Cl.[7] .................................................... C08J 7/04

(52) U.S. Cl. ........................ 427/515; 427/258; 427/261; 427/287; 427/385.5; 427/386; 427/387; 427/388.2; 427/409; 427/410; 427/413; 427/419.2; 427/508; 427/553; 427/557; 427/559; 427/595

(58) Field of Search ................................. 427/508, 515, 427/553, 557, 559, 595, 258, 261, 287, 385.5, 386, 387, 388.2, 409, 410, 413, 419.2

(56) References Cited

U.S. PATENT DOCUMENTS

| | | | | |
|---|---|---|---|---|
| 3,656,027 A | * | 4/1972 | Isley | 317/230 |
| 4,257,699 A | | 3/1981 | Lentz | |
| 4,373,239 A | | 2/1983 | Henry et al. | |
| 5,017,432 A | | 5/1991 | Eddy et al. | |
| 5,049,444 A | | 9/1991 | Bingham et al. | |
| 5,061,965 A | | 10/1991 | Ferguson et al. | |
| 5,332,641 A | | 7/1994 | Finn et al. | |
| 5,501,881 A | | 3/1996 | Fuller et al. | |
| 5,512,409 A | | 4/1996 | Henry et al. | |
| 5,729,813 A | | 3/1998 | Eddy et al. | |
| 5,998,034 A | | 12/1999 | Marvil et al. | |
| 6,002,910 A | | 12/1999 | Eddy et al. | |
| 6,037,092 A | | 3/2000 | Heeks et al. | |
| 6,113,830 A | | 9/2000 | Chen et al. | |

OTHER PUBLICATIONS

U.S. patent application Ser. No. 09/770,018, Ogren et al., filed Jan. 2001.

* cited by examiner

*Primary Examiner*—Bernard Pianalto
(74) *Attorney, Agent, or Firm*—Oliff & Berridge, PLC

(57) ABSTRACT

A process for making a multiple-layer elastomer-coated member, includes applying a coating of an elastomeric material to a supporting metallic substrate; and curing the elastomeric material by exposure to radiant energy in a radiant energy curing apparatus.

29 Claims, 2 Drawing Sheets

PROCESS FOR MAKING FUSER AND FIXING MEMBERS

BACKGROUND OF THE INVENTION

1. Field of Invention

The present invention relates to fuser or fixing members, and processes for making such fuser and fixing members. In particular, the present invention relates to processes for making such fuser and fixing members, or other members, where curing of applied layers is conducted using infrared or other radiant heat sources. The present invention also relates to developing apparatuses using such fusing and fixing members.

2. Description of Related Art

In a typical electrostatographic printing apparatus, a light image of an original to be copied is recorded in the form of an electrostatic latent image upon a photosensitive member and the latent image is subsequently rendered visible by the application of electroscopic thermoplastic resin particles, which are commonly referred to as toner. The visible toner image is then in a loose powdered form and can be easily disturbed or destroyed. The toner image is usually fixed or fused upon a support, which may be a photosensitive member itself or other support sheet such as plain paper, transparency, specialty coated paper, or the like.

The use of thermal energy for fixing toner images onto a support member is well known. In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

Typically, thermoplastic resin particles are fused to the substrate by heating to a temperature of between about 90° C. to about 160° C. or higher, depending upon the softening range of the particular resin used in the toner. It is not desirable, however, to raise the temperature of the substrate substantially higher than about 200° C. because of the tendency of the substrate to discolor at such elevated temperatures particularly when the substrate is paper.

Several approaches to thermal fusing of electroscopic toner images have been described in the prior art. These methods include providing the application of heat and pressure substantially concurrently by various means, including a roll pair maintained in pressure contact, a belt member in pressure contact with a roll, and the like. Heat may be applied by heating one or both of the rolls, plate members or belt members. The fusing of the toner particles generally takes place when the proper combination of heat, pressure and contact time are provided. The balancing of these parameters to bring about the fusing of the toner particles is well known in the art, and they can be adjusted to suit particular machines, process conditions, and printing substrates.

During operation of a fusing system in which heat is applied to cause thermal fusing of the toner particles onto a support, both the toner image and the support are passed through a nip formed between the roll pair, or plate and/or belt members. The concurrent transfer of heat and the application of pressure in the nip effects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus, increasing the background or interfering with the material being copied there. The so called "hot offset" occurs when the temperature of the toner is raised to a point where the toner particles liquefy and a splitting of the molten toner takes place during the fusing operation with a portion remaining on the fuser member.

The hot offset temperature or degradation of the hot offset temperature is a measure of the release property of the fuser roll, and accordingly it is desired to provide a fusing surface that has a low surface energy to provide the necessary release. To ensure and maintain good release properties of the fuser roll, it has become customary to apply release agents to the fuser members to ensure that the toner is completely released from the fuser roll during the fusing operation. Typically, these materials are applied as thin films of, for example, silicone oils to prevent toner offset. In addition to preventing hot offset, it is desirable to provide an operational latitude as large as possible. By operational latitude it is intended to mean the difference in temperature between the minimum temperature required to fix the toner to the paper, the minimum fix temperature, and the temperature at which the hot toner will offset to the fuser roll, the hot offset temperature.

Generally, fuser and fixing rolls are prepared by applying one or more layers to a suitable substrate. For example, cylindrical fuser and fixer rolls are typically prepared by applying a fluoroelastomer layer, with or without additional layers, to an aluminum core. The coated roll is then heated in a convection oven to cure the fluoroelastomer material. Such processing is disclosed in, for example, U.S. Pat. Nos. 5,501,881, 5,512,409 and 5,729,813, the entire disclosures of which are incorporated herein by reference.

A problem with conventional processing, however, is that the convection oven curing of the fuser or similar members requires lengthy processing time, which typically exceeds about 16, 28, 20 or more hours. For example, U.S. Pat. No. 5,759,813 discloses that the coating is cured by a stepwise heating process totaling about 24 hours, such as 2 hours at 95° C., 2 hours at 150° C., 2 hours at 175° C., 2 hours at 200° C. and 16 hours at 230° C., followed by cooling and sanding. Such lengthy curing processes, in addition to being time-consuming, are energy intensive and often require batch, rather than continuous, process operation.

Furthermore, a problem experienced with such convection oven curing of the fuser or fixing members is that the convection curing process can be detrimental in cases where the cure temperature of the coating is higher than the process temperature of the substrate and/or subsequent coatings. In these cases, the high temperatures needed to cure the fluoroelastomer coating can cause undesired changes in the substrate or other layers, altering the layers' chemical compositions and/or properties.

SUMMARY OF THE INVENTION

There is a need in the art for improved coating and curing processes, whereby the above disadvantages of the prior art convection curing processes can be overcome. Likewise, there is a need in the art for a curing process that has a higher throughput rate while still providing economic and materials advantages in forming fusing members, fixing members, and the like. These and other advantages are provided by the present invention.

The present invention provides fuser and fixing members, and similar coated members, as well as processes for the production thereof. The present invention provides a wide range of benefits not previously available in the art, including cost savings, space savings, lessened environmental impact, improved physical and operational properties, continuous process operation, and the like.

In particular, the present invention, in embodiments, provides a process for making a multiple-layer elastomer-coated member, comprising:

applying a coating of an elastomeric material to a supporting substrate; and curing the elastomeric material by exposure to radiant energy in a radiant energy curing apparatus.

The present invention also provides members, such as fuser or fixing members, made by such a process.

DETAILED DESCRIPTION OF PREFERRED EMBODIMENTS

According to embodiments of the present invention, fusing and fixing members, and the like, are provided. In embodiments, the various members are made according to any of the various known processes in the art, except that a radiant heat process is used to cure one or more of the applied layers or materials, in place of a convection curing process.

Figure 1:
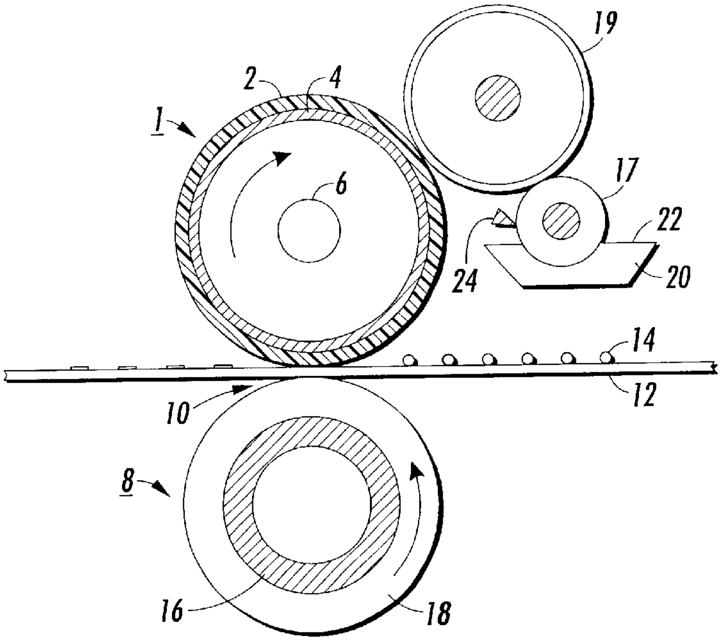
FIG. 1 is a sectional view of a fuser system that may use the fuser member according to the present invention.

A typical fuser member of the present invention is described in conjunction with a fuser assembly as shown in FIG. 1 where the numeral 1 designates a fuser roll comprising an elastomer surface 2 upon a suitable base member 4. The base member 4 can be a hollow cylinder or core fabricated from any suitable metal such as aluminum, anodized aluminum, steel, nickel, copper, and the like. The base member 4 has a suitable heating element 6 disposed in the hollow portion thereof and that is coextensive with the cylinder. Backup or pressure roll 8 cooperates with the fuser roll 1 to form a nip or contact arc 10 through which a copy paper or other substrate 12 passes, such that toner images 14 on the copy paper or other substrate 12 contact the elastomer surface 2 of fuser roll 1. As shown in FIG. 1, the backup roll 8 has a rigid steel core 16 with a soft surface layer 18 thereon, although the assembly is not limited thereto. Sump 20 contains a polymeric release agent 22 which may be a solid or liquid at room temperature, but is a fluid at operating temperatures.

In the embodiment shown in FIG. 1 for applying the polymeric release agent 22 to elastomer surface 2, two release agent delivery rolls 17 and 19 rotatably mounted in the direction indicated are provided to transport release agent 22 from the sump 20 to the elastomer surface. As illustrated in FIG. 1, roll 17 is partly immersed in the sump 20 and transports on its surface release agent from the sump to the delivery roll 19. By using a metering blade 24, a layer of polymeric release fluid can be applied initially to delivery roll 19 and subsequently to elastomer 2 of the fuser roll 1 in controlled thickness ranging from submicrometer thickness to thickness of several micrometers of release fluid. Thus, by metering device 24 about 0.1 to 2 micrometers or greater thickness of release fluid can be applied to the surface of elastomer 2.

As used herein, the term "fuser" or "fixing" member, and variants thereof, may be a roll, belt such as an endless belt, flat surface such as a sheet or plate, or other suitable shape used in the fixing of thermoplastic toner images to a suitable substrate. It may take the form of a fuser member, a pressure member or a release agent donor member preferably in the form of a cylindrical roll. Typically, the fuser member is made of a hollow cylindrical metal core, such as copper, aluminum, steel and the like, and has an outer layer of the selected cured elastomer or fluoroelastomer. Alternatively, there may be one or more intermediate layers between the substrate and the outer layer of the cured elastomer, if desired. Typical materials having the appropriate thermal and mechanical properties for such layers include silicone elastomers, fluoroelastomers, EPDM (ethylene propylene hexadiene), and Teflon™ (i.e., polytetrafluoroethylene) such as Teflon PFA sleeved rollers.

In embodiments of the present invention, the fuser member is comprised of a core, such as metals, with a coating, usually continuous, of a thermally conductive and resilient compressible material that preferably has a high thermomechanical strength. Various designs for fusing and fixing members are known in the art and are described in, for example, U.S. Pat. Nos. 4,373,239, 5,501,881, 5,512,409 and 5,729,813, the entire disclosures of which are incorporated herein by reference.

Generally, the core can include any suitable supporting material, around or on which the subsequent layers are formed. Suitable core materials include, but are not limited to, metals such as aluminum, anodized aluminum, steel, nickel, copper, and the like.

A coating, which is preferably of a thermally conductive and resilient compressible material, is then applied to the core member. The coating can be any suitable material including, but not limited to, any suitable thermally conductive fluorocarbon elastomer rubber. Suitable materials include, for example, bisphenol curable polyhexafluoropropylene-tetrafluoroethylene, and vinylidene fluoride polymers. Silicone elastomer can be combined with the fluoroelastomer in the coating compositions. Typically, it is prepared from peroxide curable polyorganosiloxane generally known as high temperature vulcanizates (HTVs), also room temperature vulcanizates (RTVs) and liquid silicon rubbers (LSRs), which are typically polydimethyl siloxanes with pendant vinyl groups including trifluoropropyl, cyanopropyl, phenyl and vinyl are used to substitute for some of the methyl groups in order to impart specific cure, mechanical or chemical properties to silicone rubber. Introduction of phenyl groups reduces elasticity and increases tensile and tear strength of vulcanizates. Phenyl groups reduce vulcanization yield. Trifluoropropyl groups increase solvent resistance. Introduction of low percentages of vinyl groups reduces vulcanization temperature and imparts greater elasticity and lower compression set to rubbers. Peroxide cure gums may also be vinyldimethylsiloxy terminated. The peroxides most commonly used are benzoyl peroxide and bis(dichlorobenzoyl) peroxide. Dicumyl peroxide can be used for vinyl containing polymers. Generally, peroxide loading is 0.2 to 1.0 percent and cure is at 120° to 140° C. In addition, other peroxides, such as 2,5-dimethyl-2,5-bis(t-butyl peroxy) hexane, can be used to crosslink HTVs at temperatures up to 180° C.

Other fluoroelastomers useful in the practice of the present invention include those described in detail in U.S.

Pat. No. 4,257,699, the entire disclosure of which is incorporated herein by reference, as well as those described in U.S. Pat. Nos. 5,017,432 and 5,061,965, the entire disclosure of which is incorporated herein by reference. As described therein, these fluoroelastomers, particularly from the class of copolymers and terpolymers of vinylidenefluoride, hexafluoropropylene and tetrafluoroethylene, known commercially under various designations as Viton A, Viton E60C, Viton E430, Viton 910, Viton GH and Viton GF. The Viton designation is a Trademark of E. I. DuPont de Nemours, Inc. Other commercially available materials include Fluorel 2170, Fluorel 2174, Fluorel 2176, Fluorel 2177 and Fluorel LVS 76, Fluorel being a Trademark of 3M Company. Additional commercially available materials include Aflas a poly(propylene-tetrafluoroethylene), Fluorel II (LII900) a poly(propylene-tetrafluoroethylene-vinylidenefluoride) both also available from 3M Company as well as the Tecnoflons identified as FOR-60KIR, FOR-LHF, NM, FOR-THF, FOR-TFS, TH, TN505 available from Montedison Specialty Chemical Co. Typically, these fluoroelastomers are cured with a nucleophilic addition curing system, such as a bisphenol crosslinking agent with an organophosphonium salt accelerator as described in further detail in the above referenced U.S. Pat. Nos. 4,257,699 and 5,017,432. A specific, non-limiting examples of a suitable curing agent is Viton Curative VC50™ (available from United Chemical Technologies, Inc.), which includes an accelerator (such as a quaternary phosphonium salt or salts like VC20) and a cross-linking agent (bisphenol AF or VC30). Other curing agents include, for example, but are not limited to, A0700 curative (N-(2-aminoethyl)-3-aminopropyltrimethoxysilane, available from United Chemical Technologies, Inc.).

In a particularly preferred embodiment, the fluoroelastomer is one having a relatively low quantity of vinylidenefluoride, such as in Viton GF, available from E. I DuPont de Nemours, Inc. The Viton GF has 35 weight percent vinylidenefluoride, 34 weight percent hexafluoropropylene and 29 weight percent tetrafluoroethylene with 2 weight percent cure site monomer.

The coating can be applied to the core member by any suitable method known in the art. Such methods include, but are not limited to, spraying, dipping, flow coating, casting or molding. Typically the surface layer of the fuser member is from about 4 to about 9 mils and preferably 6 mils in thickness, as a balance between conformability and cost and to provide thickness manufacturing latitude.

In embodiments, in addition to the core member and the outer coating layer, the fuser or other members may also optionally include one or more thermally conductive intermediate layers between the substrate and the outer layer of the cured elastomer, if desired. Such intermediate layers can include, for example, a primer layer, an adhesive layer, a metal oxide filler layer, and the like.

Typical materials having the appropriate thermal and mechanical properties for such intermediate layers include thermally conductive (e.g., 0.59 watts/meter/° Kelvin) silicone elastomers such as high temperature vulcanizable ("HTV") materials, liquid silicone rubbers ("LSR") and room temperature vulcanizable ("RTV"), which may optionally include filler materials such as an alumina filler. The silicone elastomer may have a thickness of about 2 to 10 mm (radius). An HTV is either a plain polydimethyl siloxane ("PDMS"), with only methyl substituents on the chain, $(OSi(CH_3)_2)$ or a similar material with some vinyl groups on the chain $(OSi(CH{=}CH_2)(CH_3))$. Either material is peroxide cured to create crosslinking. An LSR usually consists of two types of PDMS chains, one with some vinyl substituents and the other with some hydride substituents. They are kept separate until they are mixed just prior to molding. A catalyst in one of the components leads to the addition of the hydride group $(OSiH(CH_3))$ in one type of chain to the vinyl group in the other type of chain causing crosslinking.

To promote adhesion between the fuser member core and the hydrofluoroelastomer surface layer, an adhesive, and in particular a silane adhesive, such as described in U.S. Pat. No. 5,049,444, the entire disclosure of which is incorporated herein by reference, which includes a copolymer of vinylidenefluoride, hexafluoropropylene and at least 20 percent by weight of a coupling agent that comprises at least one organo functional silane and an activator, may be used. In addition, for the higher molecular weight hydrofluoroelastomers such as, for example, Viton GF, the adhesive may be formed from the FKM hydrofluoroelastomer in a solvent solution together with an amino silane represented by the formula as described in U.S. Pat. No. 5,332,641, the entire disclosure of which is incorporated herein by reference.

Once the desired layers are applied to the core member, the elastomer materials are cured. Although various curing methods are known in the art, such as convection over drying, the present invention uses a radiant heat drying process to cure the elastomer material. Accordingly, the coated members are preferably moved or placed into a radiant drying oven, and radiant energy is applied at a sufficient level and for a sufficient time to effect the desired degree of curing.

According to embodiments of the present invention, the radiant curing is effected by infra-red heating. Preferably, the intensity of the radiant energy is sufficient to raise the temperature of the desired material to be cured to the desired curing temperature. For example, in the case of fuser and fixing members, it is generally desired that the material be raised to a temperature of from about 200 to about 500° F., preferably from about 350 to about 475° F., and more preferably from about 400 to about 450° F. Of course, these temperature can depend on the material being cured, and can be varied as desired. Heat intensities of from about 50 to about 250, preferably from about 100 to about 225, and more preferably from about 150 to about 200 are preferred. Preferably, the heat intensity corresponds to about 2 times the voltage applied to the infrared lamps. The radiant energy curing time is generally selected to be from about 5 to about 60 minutes, more preferably from about 10 or about 15 to about 45 or about 50 minutes, and even more preferably from about 15 to about 30 minutes.

A particular benefit of the radiant energy curing over convection oven curing is that the radiant energy curing is much more efficient in terms of process time and energy consumption. For example, time efficiency is realized in that radiant energy curing can be effected in about an order of magnitude less time than used for conventional convection oven curing. Whereas conventional convection oven curing can take from about 18 to about 24 hours, radiant energy curing according to the present invention can be conducted in from about 15 to about 30 minutes.

Efficiency in terms of energy usage is realized in at least two ways. First, the shorter curing time, discussed above, results in immediate energy savings. Second, energy savings are realized because the applied radiant energy, acting in a line-of-sight manner, acts first on the outer elastomer layer of the member, rather than on the entire member as a whole. Thus, for example, the substrate layer and any intervening layers, which generally need not be cured, are not heated to the necessary curing temperature of the outer layer.

For example, a typical convection oven, such as available from Grieve Oven Company, rated at 800 kW for an 18-hour curing operation, uses 14.4 kW-hr of energy. In contrast, a radiant energy oven utilizing 36 T3 lamps, each being 16 inches long and requiring 100W/in. of lamp, and operating for a 30-minute curing operation, uses 1.66 kW-hr of energy. Accordingly, a comparable curing operation in a convection oven can use about 9 times the energy of a radiant energy curing operation.

Although the design of the radiant energy curing oven is not particularly important, the particular design can effect overall process time. For example, if the radiant energy curing oven has only a single exposure lamp, then rotation of the lamp and/or the substrate may be required in order to effect desired curing of the entire substrate. Accordingly, in embodiments, it is preferred that the radiant energy curing oven be provided with a plurality of lamps, preferably located substantially uniformly around the substrate, such that the entire substrate can be cured at the same time. If necessary, one or more masks can be used to mask or block portions of the substrates from direct exposure to the lamps.

Figure 2:
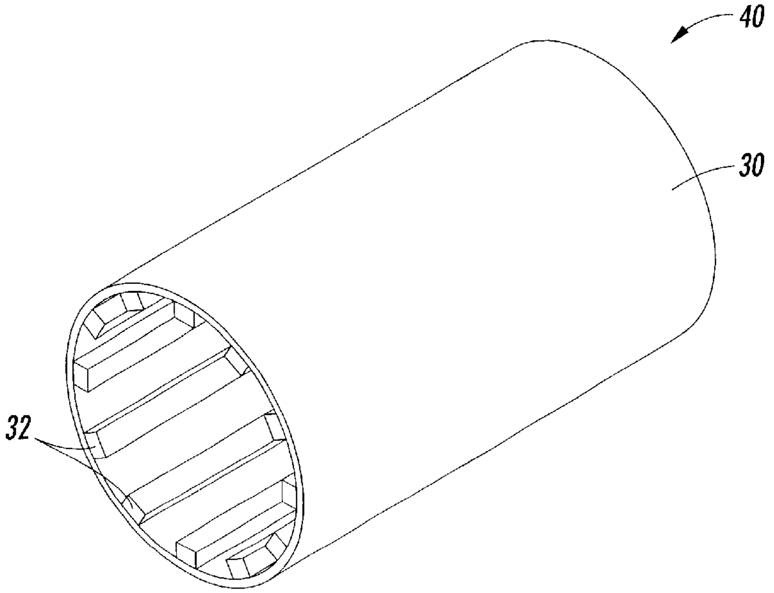
FIG. 2 is a cut-away view of an exemplary radiant energy curing oven according to the invention.
Figure 3:
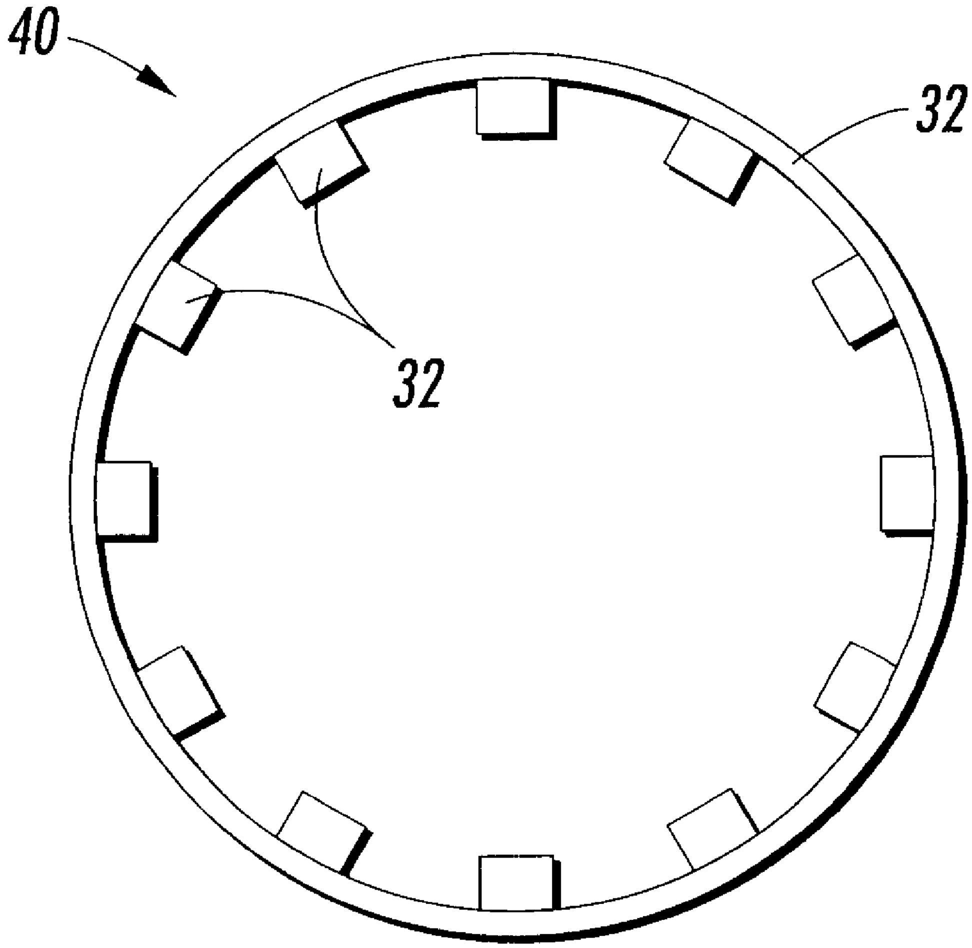
FIG. 3 is a cross-sectional view of the radiant energy curing oven of FIG. 2.

An example of such a radiant energy curing oven is shown in FIGS. 2 and 3. In FIG. 2, the radiant energy curing oven 40 includes a shell or casing 30 having attached thereto (or supported therein) a number of radiant energy emitting lamps 32. FIG. 2 shows the lamps being arranged in groups of 3 in an axial direction of the oven, with groups being spaced around the periphery of the oven. As shown in FIG. 3, the lamps 32 can be uniformly spaced around the inside of the oven 40. Substrates can be passed through the oven in any conventional means (not shown), such as by a conveyor or the like.

In embodiments, the radiant energy curing oven can be provided either in a batch curing mode or a continuous curing mode. In a continuous curing mode, for example, the oven can be provided in an elongated shape, with lamps located along the length of the oven, so that curing can be effected as the substrates are passed continuously through the oven. Such a continuous curing oven is preferred in embodiments, because the shortness of curing time lends the radiant energy curing process to a continuous operation, which is more easily integrated into an overall production process. Furthermore, the continuous curing process, when used in-line with the member manufacturing process, helps to ensure that all manufactured members have similar properties, in that they are processed a comparable length of time after the coating is applied, rather than having some members wait a longer time before a batch curing operation can be performed.

As will be apparent to those skilled in the art from the instant disclosure, the curing process may be modified in various ways to alter the cure rate and/or uniformity of the material. For example, cure rate can also be affected by the distance of the material from the infrared source. Likewise, uniformity of the curing can be improved by rotating the substrate and/or the infrared source to provide a more uniform exposure. Other modifications and various are also possible, and are encompassed by the present invention.

As described above, the radiant energy curing process of the present invention provides many significant advantages not realized in the art. For example, the present invention provides the above-described time and energy savings, which permit efficient operations, particularly in a continuous manufacturing process. In addition, however, there are still other significant advantages of the present invention.

One such advantage is that exhaust temperatures from the curing process are significantly lower than in the prior art. For example, in order to cure a part in a convection oven, it is generally necessary that the heated air be at a temperature equal to or higher than the desired cure temperature. As a result, the effluent air from the convection oven can be about 450° F. or more, resulting in a very high stack temperature. In contrast, the radiant energy curing of the present invention results in an air temperature of only about 165° F., resulting in a significantly lower stack temperature.

In addition to the time and energy savings discussed above with respect to the curing operation itself, additional time and energy savings are realized in process start-up. For example, because convection ovens generally require lengthy start-up times in order to reach the desired temperature, it has been common practice to leave convection ovens on, even when not in use. In contrast, the radiant energy ovens of the present invention have a much shorter warm-up time, which allows them to be shut down during periods of non-use. These benefits thus decrease the process start-up time when the ovens have been shut down, and decrease energy costs during periods of non-use.

Furthermore, space savings in production facilities can be drastically reduced. For example, immediate space savings can be realized in that the radiant energy curing ovens are generally smaller than comparable convection ovens and supporting equipment. Moreover, however, because of the shorter process times, discussed above, fewer radiant energy curing ovens are required to perform the same amount of work. For example, in one particular process, one radiant energy curing oven can be used in place of up to five conventional convection curing ovens.

Still further, the radiant energy curing of the present invention can also result in increased product quality. In convection curing ovens, heated air is generally passed over the part to heat the part to the curing temperature. However, the heated air can contain contaminants, which can be deposited on and incorporated into the part. This problem can be overcome in the present invention, because less air is blown across the part, thereby decreasing the contamination problem.

Even further, the radiant energy curing process of the present invention can be applied to a wider variety of materials as compared to the conventional convection curing process. According to the present invention, the radiant energy is applied to the outer layer in preference to the underlying layers of the part, since the radiant energy operates in a line-of-sight manner. This permits the outer layer of a part to be heated to a sufficient curing temperature, without also raising the underlying layers to the same temperatures, which could result in changed chemical and/or physical properties of the underlying layers.

For example, a metal roll coated with silicone rubber and overcoated with PTFE elastomer (polytetrafluoroethylene), can generally not adequately be cured in a convection oven. This is because while the outer PTFE layer requires a curing temperature of about 600–800° C., the underlying silicone rubber layer becomes embrittled and degraded at significantly lower temperatures, such as about 420° C. However, such a part could be adequately cured according to the instant radiant energy curing method, since the radiant energy can elevate the PTFE layer to the necessary curing temperature, while not elevating the temperature of the underlying layers.

As another example, it is sometimes desirable to produce parts having a plastic substrate and an elastomer coating.

However, the elastomer generally cannot be cured in a convection oven because the curing will melt the plastic substrate. However, radiant energy curing can be effectively used, because any uncoated parts can be masked, and the radiant energy selectively applied to the elastomer coating.

The following examples illustrate specific embodiments of the present invention. One skilled in the art will recognize that the appropriate reagents, and component ratios/concentrations may be adjusted as necessary to achieve specific product characteristics. All parts and percentages are by weight unless otherwise indicated.

EXAMPLES

Example 1

A coated fuser roll is made by coating a layer of VITON rubber with AO700 curative (N-(2-aminoethyl)-3-aminopropyltrimethoxysilane, available from United Chemical Technologies, Inc.) on a metallic substrate. The fuser roll substrate is a cylindrical aluminum fuser roll core about 3 inches in diameter and 16 inches long, which is degreased, grit blasted, degreased and covered with a silane adhesive as described in U.S. Pat. No. 5,332,641, the entire disclosure of which is incorporated herein by reference.

The elastomer layer is prepared from a solvent solution/dispersion containing Viton™ polymer and A0700 curative. The coating material includes the AO700 curative at a level from 2–10 pph. The solution is sprayed upon the 3 inch cylindrical roll to a nominal thickness of about 10–12 mils. The coated fuser member is then cured in an infra-red radiant energy oven for 30 minutes at a heat intensity of 200.

The fuser roller is then tested for the cross-linked density of the elastomer well as for toughness, tensile strength and elongation. The results are set Table I below.

Examples 2–8

Fuser rolls are prepared as in Example 1 above, except that the curative level, curing time, and/or heat intensity are altered, as set forth in Table I below. The fuser rolls are tested as in Example 1, and the results are presented in Table I below.

TABLE I

| Example | A0700 level (pph) | Time (min.) | Heat intensity | Cross-link density (moles of chains/cc) | Toughness | Tensile strength (psi) | Elongation (%) |
|---|---|---|---|---|---|---|---|
| 1 | 5 | 30 | 200 | $4.29 \cdot 10^{-5}$ | 4137 | 2085 | 578 |
| 2 | 5 | 15 | 200 | $4.45 \cdot 10^{-5}$ | 4461 | 2431 | 531 |
| 3 | 2 | 30 | 200 | $4.50 \cdot 10^{-6}$ | 1925 | 731 | 652 |
| 4 | 5 | 30 | 150 | $1.24 \cdot 10^{-4}$ | 3025 | 1929 | 449 |
| 5 | 2 | 15 | 200 | $6.96 \cdot 10^{-6}$ | 2941 | 1288 | 706 |
| 6 | 2 | 30 | 150 | $2.21 \cdot 10^{-5}$ | 3416 | 1505 | 726 |
| 7 | 2 | 15 | 150 | $2.43 \cdot 10^{-5}$ | 2313 | 1003 | 641 |
| 8 | 5 | 15 | 150 | $1.47 \cdot 10^{-4}$ | 2355 | 1507 | 428 |

Examples 9–16

Coated fuser rolls are made by coating a layer of VITON rubber with VC50 curative on a metallic substrate. The fuser roll substrate is a cylindrical aluminum fuser roll core about 3 inches in diameter and 16 inches long, which is degreased, grit blasted, degreased and covered with a silane adhesive as described in U.S. Pat. No. 5,332,641, the entire disclosure of which is incorporated herein by reference. The fuser roll core is also TEFLON™ coated to permit easy release of the VITON film for subsequent analysis.

The elastomer layer is prepared from a solvent solution/dispersion containing Viton™ polymer and VC50 curative. The coating material includes the VC50 curative at a level from 3–5 pph. The solution is sprayed upon the 3 inch cylindrical roll to provide a nominal cured thickness of the film of about 20 microns. The coated fuser member is cured in an infra-red radiant energy oven 24 hours after the coating is applied. The infra-red radiant oven is operated at a heat intensity of between 350 and 500. The specific parameters for each fuser roller are shown in Table II below.

The fuser rollers are then tested for their respective contact angles, and percent extractables present in the cured coating. The results are set forth in Table II below.

| Example | VC50 level (pph) | Heat Intensity | % Extractables | Surface Energy (dynes/cm) |
|---|---|---|---|---|
| 9 | 3 | 500 | 21.82 | 31.47 |
| 10 | 5 | 500 | 2.04 | 35.99 |
| 11 | 4 | 425 | 7.68 | 29.46 |
| 12 | 3 | 350 | 9.4 | 31.83 |
| 13 | 4 | 425 | 6.43 | 27.79 |
| 14 | 5 | 350 | 0.74 | 31.25 |
| 15 | 4 | 425 | 6.94 | 31.79 |
| 16 | 4 | 425 | 9.55 | 32.24 |

These Examples show the influence on physical properties from changing the percent curative content and the heat intensity of the infra-red oven.

While the invention has been described in conjunction with the specific embodiments described above, it is evident that many alternatives, modifications and variations are apparent to those skilled in the art. In particular, although the above discussion of the invention is with respect to fuser rolls or fixing members for electrostatographic printing processes, the invention can be applied to any type of member having an elastomer coating over a supporting substrate. Accordingly, the preferred embodiments of the invention as set forth above are intended to be illustrative and not limiting. Various changes can be made without departing from the spirit and scope of the invention.

What is claimed is:

1. A process for making an elastomer-coated member, comprising:

applying a coating of an elastomeric material to a supporting metallic substrate; and curing the elastomeric material by exposure to radiant energy in a radiant energy curing apparatus over a time period of from about 5 to about 60 minutes and in an absence of convection heating, wherein the radiant energy cross-links the elastomeric material, wherein said elastomer-coated member is a member, suitable for use in an electrostatographic printing process, selected from the group consisting of a fuser member, a fixing member, a pressure roller, and release agent donor member.

2. The process according to claim 1, wherein the supporting substrate is formed of a plastic material.

3. The process according to claim 1, wherein the supporting substrate is in a form of a hollow cylinder, a belt or a sheet.

4. The process according to claim 1, wherein the supporting substrate is formed of a material selected from the group consisting of aluminum, anodized aluminum, steel, nickel, copper, and mixtures thereof.

5. The process according to claim 1, wherein the elastomeric material comprises a curable material selected from the group consisting of silicone elastomers, fluoroelastomers, ethylene propylene hexadiene, polytetrafluoroethylene, perfluoroalkoxy resins, and mixtures thereof.

6. The process according to claim 1, wherein the elastomeric material is a high temperature vulcanizate.

7. The process according to claim 1, wherein the elastomeric material is curable by a curing agent selected from the group consisting of bisphenol curatives and silane curatives.

8. The process according to claim 1, wherein the coating of the elastomeric material has a thickness of from about 4 to about 12 mils.

9. The process according to claim 1, further comprising applying a coating of an intermediate layer material to said supporting substrate prior to applying the coating of an elastomeric material.

10. The process according to claim 9, wherein said intermediate layer material is selected from the group consisting of a primer, an adhesive, a metal oxide filler, and mixtures thereof.

11. The process according to claim 1, wherein the radiant energy is infra-red radiation.

12. The process according to claim 1, wherein said applying and curing steps are conducted in-line in a continuous process.

13. The process according to claim 1, wherein the curing step cures the elastomeric material but does not chemically modify materials of underlying layers.

14. The process according to claim 1, wherein the radiant energy is infra-red radiation and wherein the curing is conducted at a heat intensity of from about 50 to about 250 and for a period of form about 5 to about 60 minutes.

15. The process according to claim 1, wherein the elastomer comprises a curable fluoroelastomer material.

16. The process according to claim 1, wherein the elastomer comprises a curable polytetrafluoroethylene material.

17. The process according to claim 1, wherein the elastomer comprises a curable perfluoroalkoxy resin.

18. The process according to claim 1, wherein the elastomer comprises a material selected from the group consisting of a bisphenol curable polyhexafluoropropylene-tetrafluoroethylene, and vinylidene fluoride polymers.

19. The process according to claim 18, wherein the elastomer comprises a material selected from the group consisting of copolymers and terpolymers of vinylidenefluoride, copolymers and terpolymers of hexafluoropropylene and copolymers and terpolymers of tetrafluoroethylene.

20. A process for making a multiple-layer elastomer-coated member, comprising:

applying a coating of an elastomeric material to a supporting metallic substrate; and curing the elastomeric material by exposure to radiant energy in a radiant energy curing apparatus over a time period of from about 5 to about 60 minutes and in an absence of convection heating, wherein the radiant energy cross-links the elastomeric material, wherein said supporting substrate is a metal roll coated with silicone rubber, and said elastomeric material is fluoroelastomer.

21. The process according to claim 20, wherein said curing cures the elastomeric material without elevating a temperature of said silicone rubber.

22. The process according to claim 20, wherein said curing cures the elastomeric material without embrittling and degrading said silicone rubber.

23. The process according to claim 20, wherein the radiant energy is infra-red radiation and wherein the curing is conducted at a heat intensity of from about 50 to about 250 and for a period of form about 5 to about 60 minutes.

24. The process according to claim 20, wherein the fluoroelastomer comprises a material selected from the group consisting of a bisphenol curable polyhexafluoropropylene-tetrafluoroethylene, and vinylidene fluoride polymers.

25. The process according to claim 24, wherein the fluoroelastomer comprises a material selected from the group consisting of copolymers and terpolymers of vinylidenefluoride, copolymers and terpolymers of hexafluoropropylene and copolymers and terpolymers of tetrafluoroethylene.

26. The process according to claim 20, wherein a curing temperature of the fluoroelastomer is greater than an embrittlement temperature of the silicone rubber.

27. The process according to claim 20, wherein said curing step cures the elastomeric material without causing embrittlement and degradation of the silicone rubber.

28. A process for making an elastomer-coated member, comprising:

applying a coating of an elastomeric material to a supporting plastic substrate; and curing the elastomeric material by exposure to radiant energy in a radiant energy curing apparatus over a time period of from about 5 to about 60 minutes and in an absence of convection heating, wherein the radiant energy cross-links the elastomeric material, wherein said elastomer-coated member is a member, suitable for use in an electrostatographic printing process, selected from the group consisting of a fuser member, a fixing member, a pressure roller, and release agent donor member.

29. The process according to claim 28, wherein the elastomer comprises a curable fluoroelastomer material.

* * * * *